US011161189B2

(12) United States Patent
D'Amario

(10) Patent No.: US 11,161,189 B2
(45) Date of Patent: Nov. 2, 2021

(54) WIRE ELECTRICAL DISCHARGE MACHINING METHOD

(71) Applicant: Agie Charmilles SA, Losone (CH)

(72) Inventor: Rino D'Amario, Sigirino (CH)

(73) Assignee: Agie Charmilles SA

( * ) Notice: Subject to any disclaimer, the term of this patent is extended or adjusted under 35 U.S.C. 154(b) by 275 days.

(21) Appl. No.: 16/106,839

(22) Filed: Aug. 21, 2018

(65) Prior Publication Data
US 2019/0061031 A1   Feb. 28, 2019

(30) Foreign Application Priority Data

Aug. 22, 2017   (EP) .................................... 17187254

(51) Int. Cl.
*B23H 7/02*   (2006.01)
*B23H 7/20*   (2006.01)
(Continued)

(52) U.S. Cl.
CPC ............... *B23H 7/20* (2013.01); *B23H 1/022* (2013.01); *B23H 7/02* (2013.01); *B23H 7/04* (2013.01);
(Continued)

(58) Field of Classification Search
None
See application file for complete search history.

(56) References Cited

U.S. PATENT DOCUMENTS 4,329,558 A * 5/1982 Martin ..................... B23H 7/04
219/69.12
4,675,491 A * 6/1987 Marendaz ................ B23H 7/04
219/69.12
(Continued)

FOREIGN PATENT DOCUMENTS

CH    653 585 A5   1/1986
CH    662 075 A5   9/1987
(Continued)

OTHER PUBLICATIONS

Suzuki, et al, Machining feed control device for wire electric discharge machine, Espacenet translation, Jul. 1987, Description, Drawings (Year: 1987).*
(Continued)

*Primary Examiner* — Tu B Hoang
*Assistant Examiner* — Masahiko Muranami
(74) *Attorney, Agent, or Firm* — Harness, Dickey & Pierce, P.L.C.

(57) ABSTRACT

A method for controlling a wire electrical discharge machining process, wherein the method comprises the following steps:
  dividing a workpiece height $H_{WP}$ into a number $N_S$ of vertical sections S of the workpiece,
  setting a defined observation period $T_M$, $N_{DTM}$,
  with each discharge Di,
  determining a discharge position of each discharge,
  counting the number of discharges
  determining any numbers of discharges and
  adjusting at least one process parameter.

9 Claims, 6 Drawing Sheets

Figure 1:
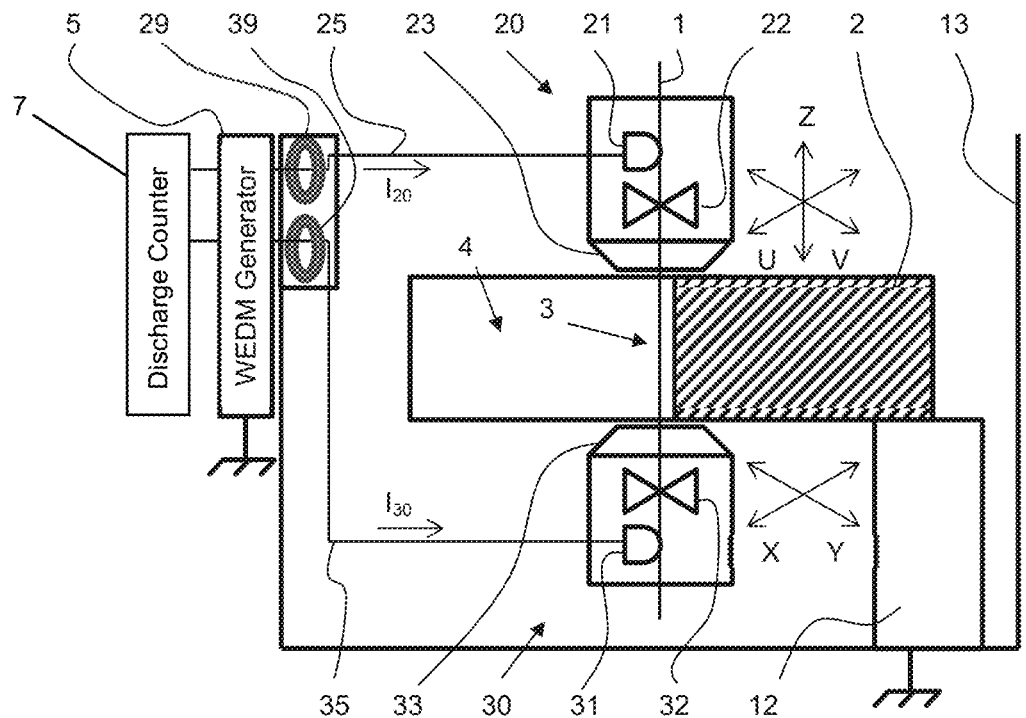

(51) Int. Cl.
  *B23H 7/04* (2006.01)
  *G06N 20/00* (2019.01)
  *B23H 1/02* (2006.01)
  *G05B 13/02* (2006.01)
  *G05B 19/042* (2006.01)

(52) U.S. Cl.
  CPC ..... *G05B 13/0265* (2013.01); *G05B 19/0426* (2013.01); *G06N 20/00* (2019.01)

(56) References Cited

U.S. PATENT DOCUMENTS

| | | | | |
|---|---|---|---|---|
| 4,691,089 | A * | 9/1987 | Balleys | B23H 7/04 |
| | | | | 219/69.12 |
| 4,963,711 | A * | 10/1990 | Obara | B23H 7/04 |
| | | | | 219/69.12 |
| 5,744,775 | A * | 4/1998 | Yasuda | B23H 7/04 |
| | | | | 219/69.12 |
| 9,682,436 | B2 | 6/2017 | d'Amario | |
| 2008/0110865 | A1* | 5/2008 | Hashimoto | B23H 7/04 |
| | | | | 219/69.12 |
| 2010/0133237 | A1* | 6/2010 | Onodera | B23H 1/024 |
| | | | | 219/69.13 |
| 2014/0236341 | A1* | 8/2014 | Nishikawa | B23H 7/065 |
| | | | | 700/162 |
| 2016/0288230 | A1* | 10/2016 | Furuta | B23H 1/024 |
| 2017/0060105 | A1* | 3/2017 | Onodera | G05B 13/0265 |

FOREIGN PATENT DOCUMENTS

| | | | |
|---|---|---|---|
| DE | 35 23 688 | A1 | 1/1986 |
| EP | 0 578 018 | A1 | 1/1994 |
| EP | 2 581 162 | A1 | 4/2013 |
| EP | 2 842 678 | A1 | 3/2015 |
| JP | S55-011761 | A | 1/1980 |
| JP | S62-054626 | A | 3/1987 |
| JP | S62-114828 | A | 5/1987 |
| JP | S62152616 | * | 7/1987 ............... B23H 7/04 |
| JP | S63-288627 | A | 11/1988 |
| JP | S64-016316 | A | 1/1989 |
| JP | 2009-233842 | A | 10/2009 |

OTHER PUBLICATIONS

Extended European Search Report for Application No. EP 17 18 7254 dated Feb. 9, 2018 (8 pages).

* cited by examiner

NORMAL discharge Pulse

| Protection Level | Threshold | Stepped workpiece | | |
|---|---|---|---|---|
| | | No steps | Up or Down | Up & Down |
| 0 | < 64 | 0 | 1 / 12 | 1 / 8 |
| 1 | > 64 | 1 / 12 | 1 / 10 | 1 / 6 |
| 2 | > 80 | 1 / 10 | 1 / 8 | 1 / 4 |
| 3 | > 96 | 1 / 8 | 1 / 6 | 1 / 3 |
| 4 | > 128 | 1 / 4 | 1 / 3 | 1 / 2 |
| 5 | > 256 | 1 / 2 | 1 / 2 | 3 / 4 |

SHORT discharge Pulse

| Protection Level | Threshold | Stepped workpiece | | |
|---|---|---|---|---|
| | | No steps | Up or Down | Up & Down |
| 0 | < 64 | 0 | 1 / 10 | 1 / 8 |
| 1 | > 64 | 1 / 10 | 1 / 8 | 1 / 5 |
| 2 | > 80 | 1 / 8 | 1 / 6 | 1 / 4 |
| 3 | > 96 | 1 / 6 | 1 / 4 | 1 / 3 |
| 4 | > 128 | 1 / 4 | 1 / 3 | 1 / 2 |
| 5 | > 256 | 1 / 2 | 1 / 2 | 3 / 4 | a)   b)   c)   d)

Fig. 11
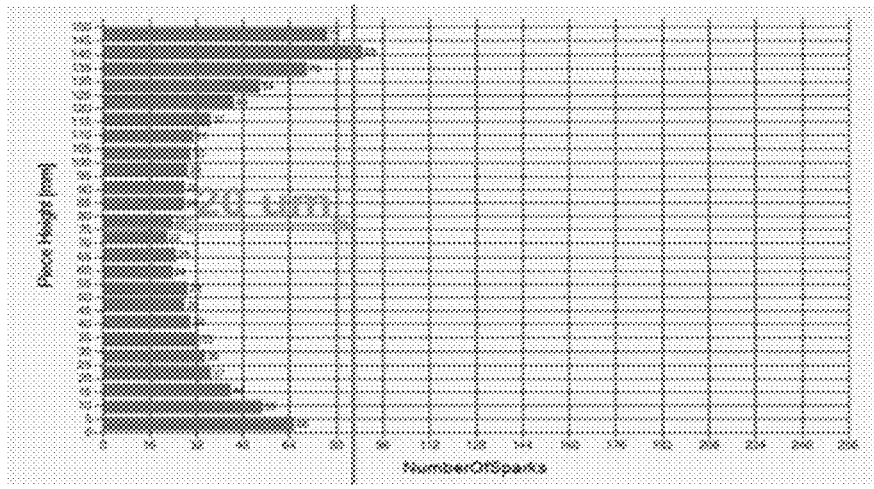
Fig. 12
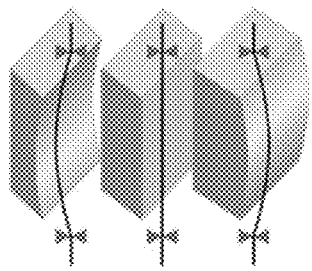
Fig. 13
| Discharge Di | $D_{(i)}$ | $D_{(i-1)}$ | $D_{(i-2)}$ | $D_{(i-3)}$ | $D_{(i-4)}$ | $D_{(i-5)}$ | $D_{(i-6)}$ | $D_{(i-7)}$ | $D_{(i-8)}$ | $D_{(i-9)}$ |
|---|---|---|---|---|---|---|---|---|---|---|
| Vertical section Sj | 9 | 9 | 9 | 9 | 9 | 2 | 24 | 10 | 5 | 29 |

WIRE ELECTRICAL DISCHARGE MACHINING METHOD

CROSS-REFERENCE TO RELATED APPLICATION

This application claims the benefit and priority of European Patent Application No. 17 187 254.2, filed Aug. 22, 2017. The entire disclosure of the above application is incorporated herein by reference.

BACKGROUND

Field of the Invention

The present invention refers to a method for the control of a wire electrical discharge machining process, in particular to a method to control a wire electrical discharge machining process based on the information of space and time of the occurring discharges.

Discussion

The wire electrical discharge machining process (referred to as WEDM) is versatile and extremely accurate. A desired contour is cut in a workpiece by means of a wire electrode (wire). Wire and workpiece are moved relatively to each other according to the instructions of a machining program. The process is conducted by applying voltage to the gap between the workpiece and the wire. The workpiece material is removed by the action of electrical discharge pulses (referred to as discharges, sparks, pulses).

The process is normally conducted by first executing a main cut by which the geometry is generated, and then executing one or more trim cuts to achieve the desired final surface quality. In a main cut the cutting speed along the path is servo-controlled such as to maintain an appropriate distance (gap width) between workpiece and wire, which is in the order of 5 to 50 µm. The relative position of the wire and the workpiece is adjusted by means of the machine axes, and the distance is controlled on the base of the process signals including at least one of the ignition delay time, the average pulse voltage or derived values. In a trim cut the cutting speed is again servo-controlled or a fixed speed.

Process signals are determined with basic measurement of voltage, current and time. For instance the ignition delay time is essentially determined by setting a threshold level of a rising flank and a falling flank of the voltage signal, and determining delay. Ignition delay time and other process signals such as the level of the erosion voltage, current amplitude, voltage gradients, etc. are used to classify the pulses, for monitoring purposes and for process optimization. Process signals can be measured, processed and evaluated in real time to get information about the condition of the machining process and possibly to react in real-time or near real-time.

The discharges are distributed along the engagement line of wire and workpiece and according to the machining conditions within the gap. The distribution of discharges should be essentially uniform to get the best results, however for different reasons, such as debris distribution, wire oscillation, distribution of the quantity of material to be removed, etc. this is not always the case.

It is known that the position at which the discharges which actually occur along the engagement line of wire and workpiece can be computed on the base of partial currents fed through an upper and a lower current path. For instance, CH653585A5 [1983 Sep. 7] discloses a method to compute the distance Z of an electric discharge along the portion of the wire electrode in the machining zone between the electrode wire and the workpiece, said distance being indicated from the center point between the current feeding contacts, the method including subtracting and adding the intensities of the currents flowing respectively in each of an upper and a lower line, in the course of each electrical discharge, and a circuit for obtaining a value which is proportional to the quotient of the subtraction by the addition. The measurement of the discharge position is used for monitoring the thermal load of the wire and to prevent wire breakage due to a concentration of discharge. This document further suggests to measure the current within the generator.

CH662075A5 [1984 Oct. 17] discloses a method to selectively supply the machining current to the wire through the upper or the lower or both current feeding branches of the WEDM machine, as a function of the position where an electrical discharge is detected. Said detection is made as explained in the afore cited CH653585A5. The position of breakdown of a low power discharge provided by a first current power supply is detected, and the high power discharge provided by a second current power supply is then selectively fed through the desired current branch. Further the method provides a rough implement to prevent localized heating of the wire by determining concentration of faulty electrical discharges at any given location along the wire and by controlling the selective supply accordingly.

JP36416316A [1987 Mar. 13] also includes two sources and controls the supply to the gap from two feeding branches, thus has essentially the same object and solution as CH662075A.

JPS6254626A [1985 Sep. 2] discloses a method in which the position of successive discharges along the wire is measured in known manner, and where said positions are correlated with the traveling speed of the wire to discriminate a state of concentrated discharges at a certain position of the traveling wire. If the concentrated state is detected and exceeds a preset duration, then the processing conditions such as pulse power may be automatically changed to prevent wire disconnection.

JPS63288627A [1987 May 19] discloses a method to improve the machining straightness with WEDM. The discharge position is determined based on the current flowing in each of a pair of current feeders in known manner; when it is determined that a discharge occurs at a predetermined position the supply of pulse power is stopped for a specified period, for instance by introducing a pulse pause of 1 ms.

EP2581162A1 [2011 Oct. 13] discloses a method in which the pulse types are discriminated in known manner and the position of each discharge is determined in known manner, and where the number of ineffective discharge pulses not contributing to machining discharge pulses is counted. When a number of ineffective discharge pulses are detected to occur at a certain position the flushing of the gap through the upper or lower flushing nozzle, whichever is closer to the position of the ineffective discharges, is modified to eliminate the uneven discharge state.

As shown here above with reference to prior art this information is processed and used for several applications. Machining process issues are individually addressed, however it would be desirable to get a holistic control of the wire electrical discharge machining process, which considers the overall progress of the machining, and in the same time monitors the local condition in the gap but also the condition of the wire.

SUMMARY OF THE INVENTION

An aspect of the present invention is to achieve an uniform machining surface by controlling the overall progress of WEDM machining and by adapting the machining parameters to the highest discharge density along the engagement line of a wire electrode and the workpiece. This first object is achieved by dividing a workpiece height $H_{WP}$ into a number of vertical sections S, by setting a defined observation period $T_M$, $N_{DTM}$, then, and with each discharge pulse Di, i.e. in real time: determining a discharge position $Z_{Di}$ of each discharge Di along an engagement line of a wire electrode and the workpiece and assigning each discharge Di to a matching vertical section $S_j$ of the workpiece based on the determined position $Z_{Di}$ of each discharge; counting the number of discharges No, occurring in each vertical section $S_i$ within the observation period $T_M$, $N_{DTM}$; determining a highest number of discharges $N_{Dhigh}$ per vertical section within the observation period $T_M$, $N_{DTM}$; comparing said highest number of discharges per vertical section with one or more protection levels specifying a predetermined limit for the number of discharges per vertical section; and lastly, adjusting at least one machining parameter, if it is determined that the highest number of discharges Norio occurring in one or more vertical section $S_j$ exceeds or falls below of a protection level.

Another aspect of the present invention is to avoid surface damages due to concentrated discharges by controlling the WEDM process based on the occurrence of consecutive discharges at a specific position of the workpiece. This second object is achieved by dividing a workpiece height $H_{WP}$ into a number of vertical sections S; then, with each discharge pulse: determining a discharge position $Z_{Di}$ of each discharge Di along an engagement line of a wire electrode and the workpiece and assigning each discharge Di to a matching vertical section $S_j$ of the workpiece based on the determined position $Z_{Di}$ of each discharge; counting the number of consecutive discharges $N_{DC}$ occurring in each vertical section Sj; and adjusting at least one machining parameter if it is determined that the number of consecutive discharges $N_{DC}$ in a vertical section exceeds a predefined maximum number of consecutive discharges $N_{DCmax}$.

Still another aspect of the present invention is to prevent wire breaking due to excessive thermal load given with concentrated discharges by controlling the WEDM process based on the occurrence of consecutive discharges at a specific position of the wire. The second and the third object are achieved essentially with the same method.

A still further aspect of the present invention is to prevent wire breaking due to erosion craters on the wire surface and thus weakening of the wire cross section by controlling the WEDM process based on the cumulated number of discharges occurring at each position of the traveling wire. Here the deterioration of the traveling wire due to the cumulated number of discharges at each position of the traveling wire is monitored. This fourth object is achieved by dividing a workpiece height $H_{WP}$ into a number of vertical sections S, and with each discharge pulse: counting the number of discharges No occurring in each vertical section Sj; when the wire has traveled through a vertical section, shifting the counted number of discharges from that vertical section to the adjacent vertical section in wire traveling direction; and, adjusting at least a machining parameter if it is determined that the number of discharges $N_{DC}$ in a vertical section exceeds a predefined maximum allowed number of cumulated discharges $N_{DWmax}$.

Summarizing, the preferred embodiment of the invention is to control the wire electrical discharge machining process with adjusted machining parameters to prevent damages to the workpiece and to avoid wire breaking. Adjustment of machining parameters is made in consideration of the highest number of discharges occurring in an observation period in the vertical sections of the workpiece, in consideration of the number of consecutive number of discharges in the vertical sections of the workpiece, and in consideration of the cumulated number discharges occurring in each vertical section from the viewpoint of the wire. These objects are at least partially fused using a common approach for the acquisition and mapping of the discharges in time and space.

Other aspects, advantageous characteristics and embodiments are explained in the further description.

DETAILED DESCRIPTION AND DRAWINGS

Figure 2:
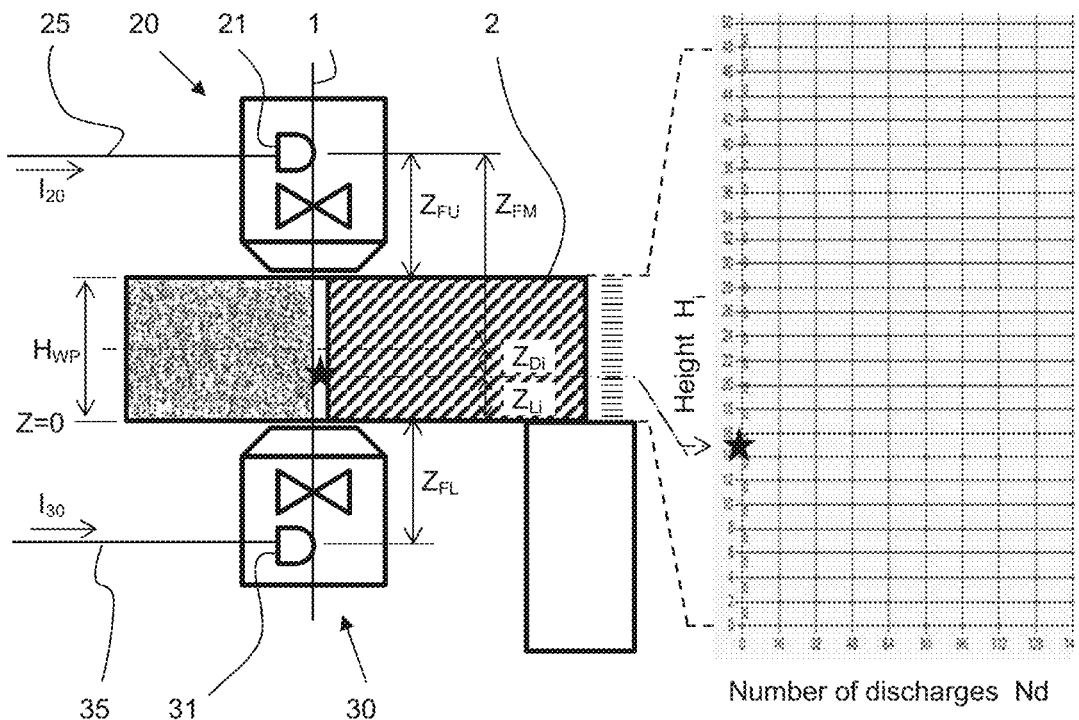
Figure 3:
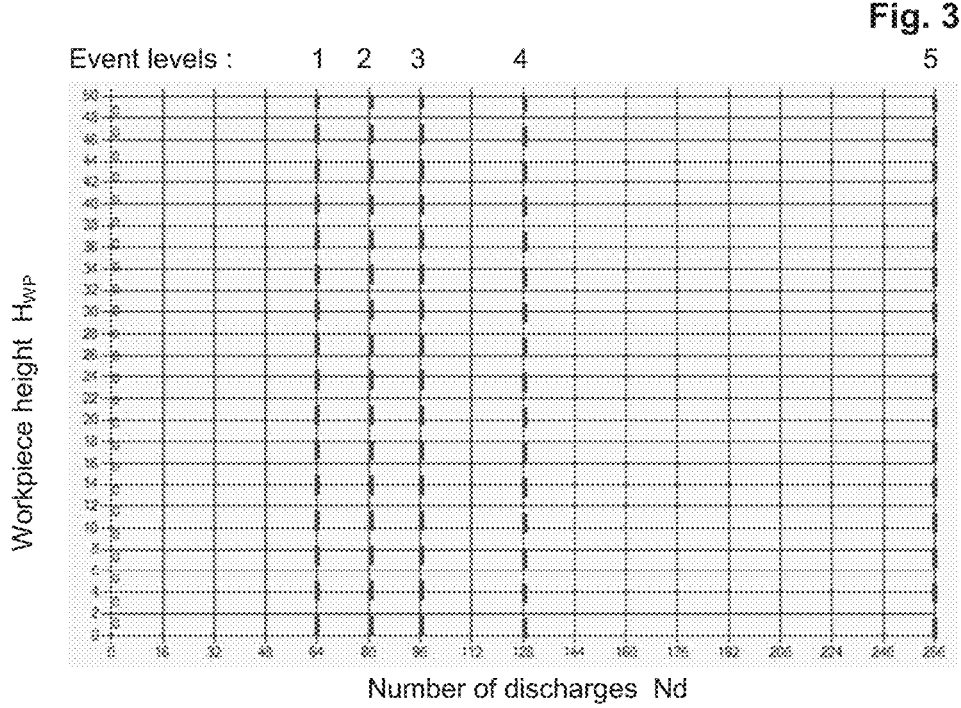
Figure 4:
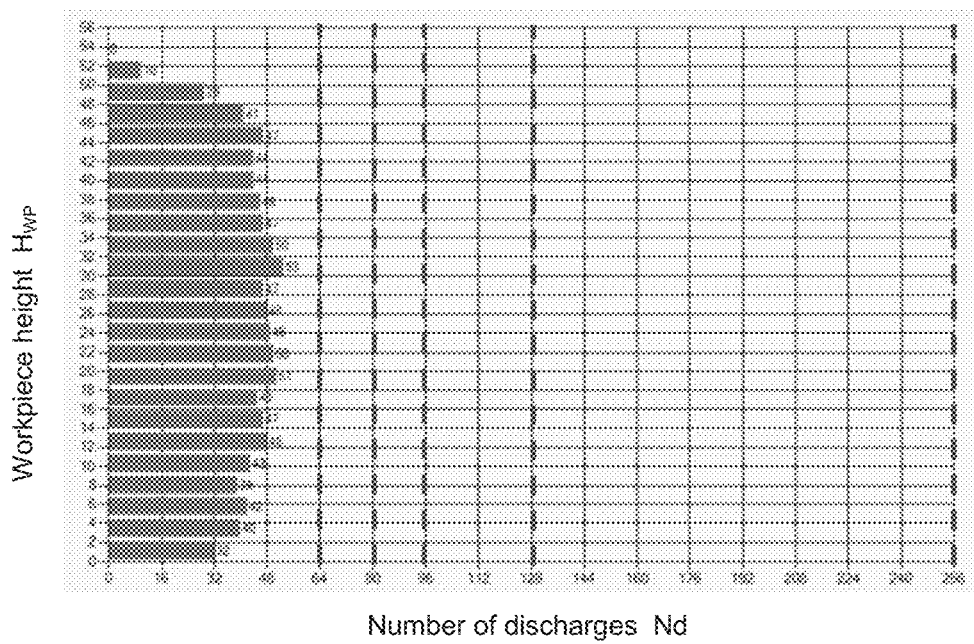
Figure 5:
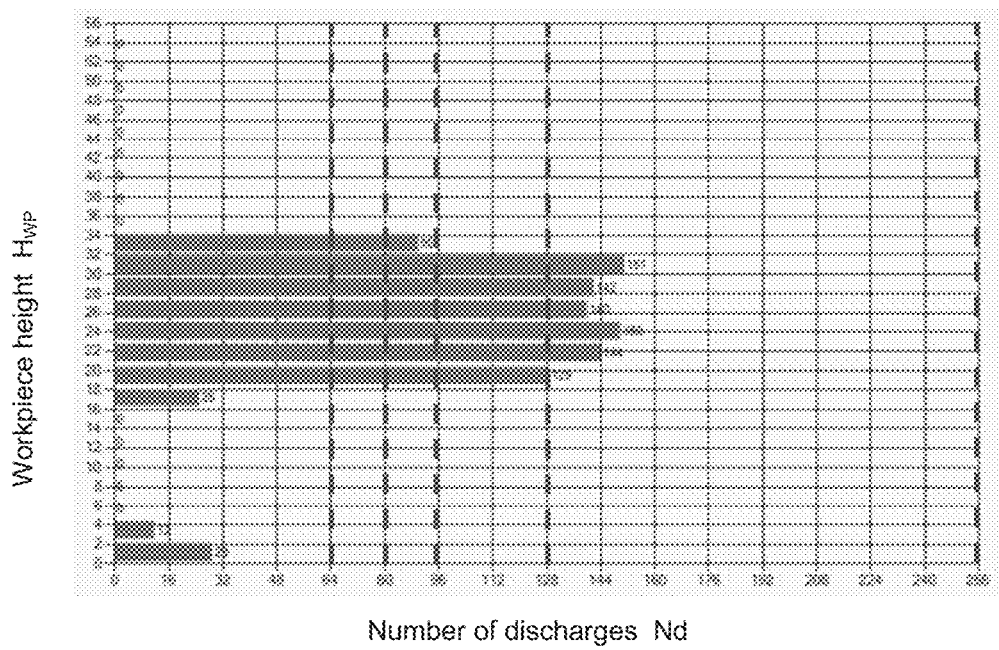
Figure 6:
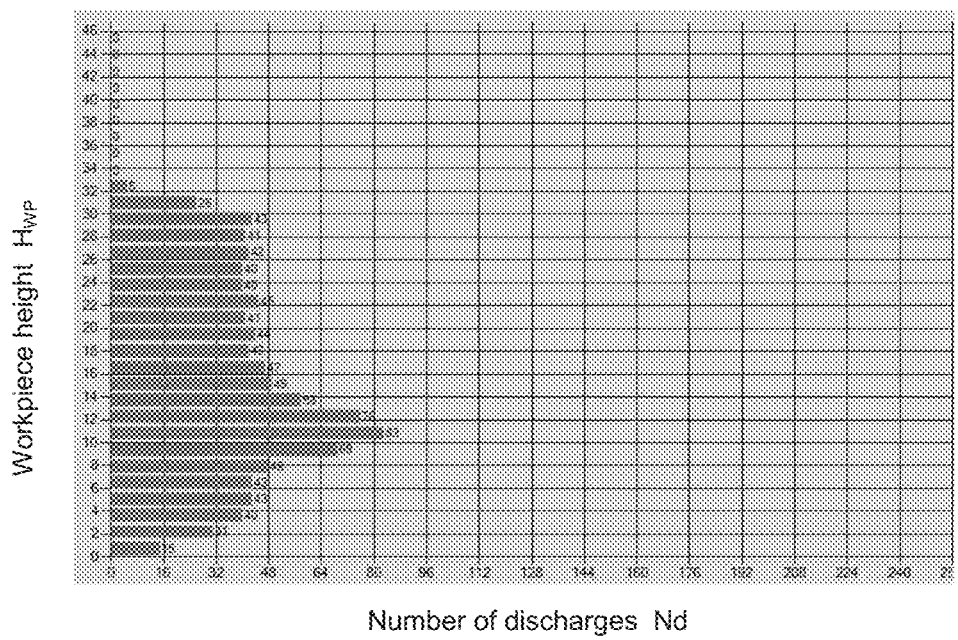
Figures 7A, 7B, 8:
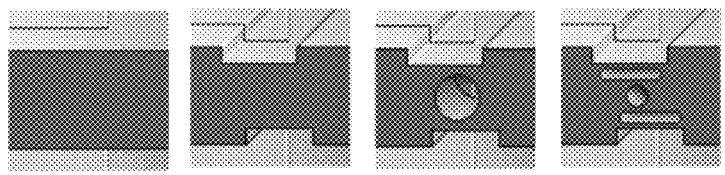
Figure 9:
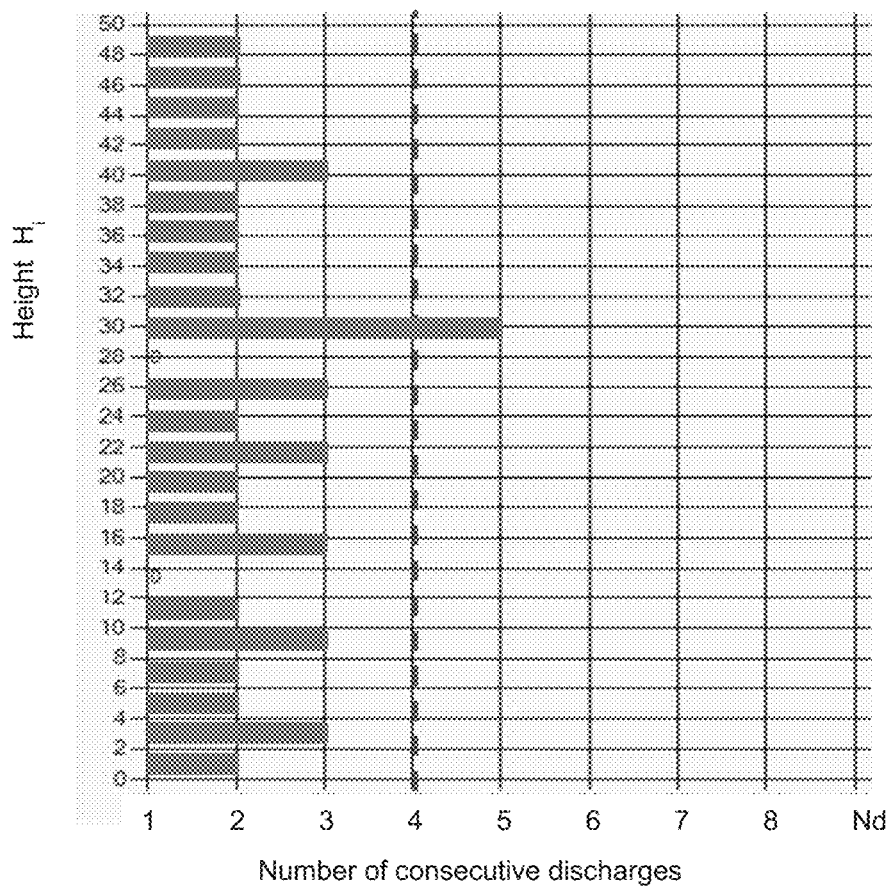
Figure 10:
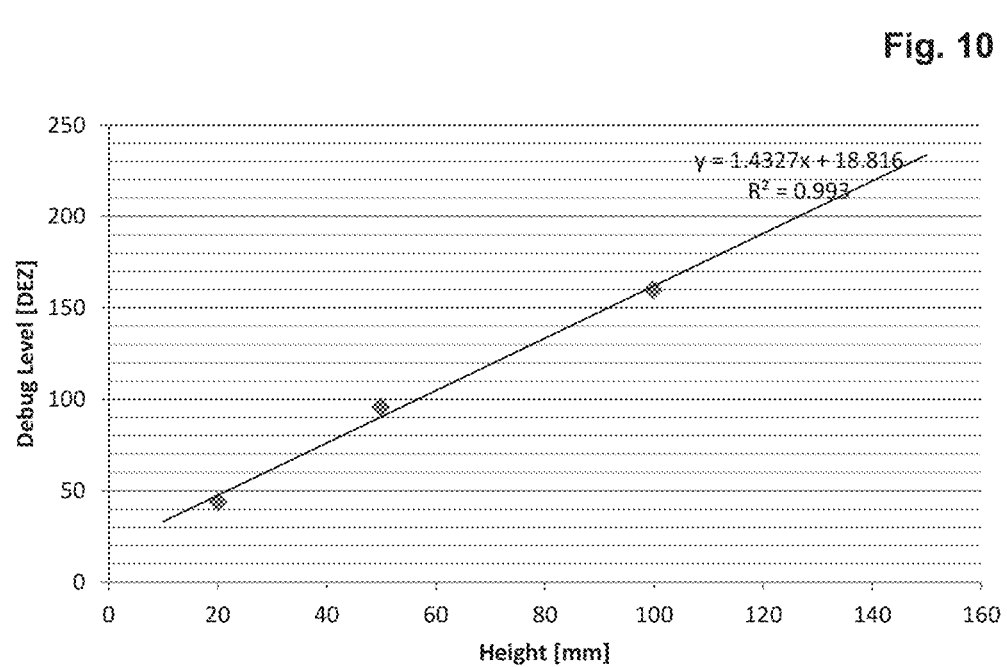

The invention and certain embodiments thereof are now described, by way of examples, and with reference to the accompanying drawings. The figures show the following:

FIG. 1 a simplified sketch of the working area of a wire electrical discharge machine;

FIG. 2 a recording scheme for the determination of the discharge distribution according to the invention;

FIG. 3 a graph illustrating the setting of protection levels;

FIG. 4 a graph illustrating a first exemplary distribution of discharges in vertical sections;

FIG. 5 a graph illustrating a second exemplary distribution of discharges in vertical sections;

FIG. 6 a graph illustrating a third exemplary distribution of discharges in vertical sections;

FIG. 7a,b two tables illustrating exemplary pulse suppression rules;

FIG. 8 an image illustrating various workpiece cross-sections;

FIG. 9 a graph illustrating a third exemplary distribution of discharges in vertical sections;

FIG. 10 a graph illustrating a the determination of the range of current difference values;

FIG. 11 a graph illustrating a third exemplary distribution of discharges in vertical sections;

FIG. 12 an image illustrating even and uneven material removal in a wire cutting process;

FIG. 13 a table illustrating the mechanism of a consecutive discharges counter.

DETAILED DESCRIPTION OF THE PREFERRED EMBODIMENTS

First, the relevant parts of a wire electrical discharge machine according to the present invention are described with reference to FIG. 1, which however is not true to scale.

The wire electrical discharge machine comprises a table 12 on which a workpiece 2 is mounted in view of machining. A wire electrode 1 is guided by upper and a lower wire guide 22, 32, which are incorporated respectively in an upper and a lower head 20, 30. The upper and the lower head 20, 30 each further comprise a flushing nozzle 23, 33 by which the machining fluid is directed towards the workpiece, into a cutting kerf, from above and from below. The upper and the lower head 20, 30 comprise an upper respectively a lower current feeder 21, 31 by which the discharge current is supplied to the traveling wire electrode by way of a sliding contact. The discharge pulses are fed from the generator 5 to the wire 1 by means of a cabling; An upper cable 25 and a lower cable 35 are provided to separately connect the generator to the upper and lower current feeder 21, 31. The discharges occur in the interelectrode distance or gap 3. The generator is preferably designed such as to be perfectly integrated with a work tank 13, as disclosed in EP 2 842 678 A. The section including the upper cable 25 and upper current feeder 21 is referred to as the upper feeding path, whereas the section including the lower cable 35 and lower current feeder 31 is referred to as the lower feeding path. Upper and lower feeding paths may each typically comprise more than one cable respectively more than one channel, to achieve high pulse currents and a symmetric current feed in the working area.

The partial discharge currents I20 and I30 flowing to the wire through the upper feeding path and lower feeding path are measured separately, for instance using a toroidal current transformers 29, 39, with the upper current carrying cable 25 passed through a toroid 29 and the lower current carrying cable 35 passed through a toroid 39. Toroidal current transformers make contactless sensing of the current possible. The current carrying cable 25, 35 represents the primary conductor. A secondary winding on the toroidal current transformer is practical to scale down the current by a factor, which is the inversely proportional of the windings ratio. The current signals I20, I30 flowing through upper and lower feeder are compared by a differential current amplifier; current difference signal is associated to a discharge position. For convenience the partial currents are generally measured only in the upper and lower feeding path of one generator channel.

The invention discloses a method for controlling a wire electrical discharge machining process based on the determination of the discharge positions on the workpiece, along an engagement line of the wire electrode and the workpiece, and comprising:

a workpiece discharge distribution monitoring and control loop (referenced as first control loop) which adapts the machining parameters in real time in consideration of the vertical section with the highest number of discharges occurred during the observation period; and a workpiece discharge concentration monitoring and control loop (referenced as second control loop), which adapts the machining parameters in real time in consideration of the number of consecutive discharges occurring in a vertical section.

The invention further discloses a method for controlling a wire electrical discharge machining process based on the determination of the discharge positions on the traveling wire, and comprising:

a wire discharge concentration monitoring and control loop (referenced as third control loop), which adapts the machining parameters in real time in consideration of the number of consecutive discharges occurring in a vertical section; and a wire deterioration monitoring and control loop (referenced as fourth control loop), which adapts the machining parameters in consideration of the cumulated local weakening of the wire due to accumulation of discharge craters.

These monitoring and control loops will now be described in more detail.

A FIRST CONTROL LOOP monitors the distribution of the discharges along the entire engagement line of wire and workpiece. This wire electrical discharge machining control method comprises the steps of dividing the workpiece height $H_{WP}$ into a number $N_S$ of vertical sections S of the workpiece, setting a defined observation period $T_M$, $N_{DTM}$, determining the discharge position $Z_{Di}$ of each discharge Di within an observation period, assigning each discharge to a vertical section based on the determined position, and counting the number of discharges No occurring in each vertical section incrementing a section specific counter when a discharge is assigned to that vertical section. The highest number of discharges occurred in a vertical section in the observation period determines an adjustment of the machining process. Said highest number of discharges occurred in the observation period, i.e. the peak number of discharges is compared with at least one predefined protection level and determines a machining parameter adjustment if a protection level is exceeded or under-run.

This bookkeeping of the number of discharges per vertical sections provides an effective monitoring means and an instrument for the control of the process, in which the machining parameters are adapted to the actual distribution of the discharges.

Vertical sections: This aspect of the invention will now be described in more detail. The workpiece height $H_{WP}$ is the total height of the workpiece; the position of the upper head is generally set such as to match with said workpiece height. The Z axis position setting is thus generally equivalent to the total workpiece height $H_{WP}$. The workpiece height $H_{WP}$ is divided into a number of $N_S$ distinct vertical sections S. These vertical sections S correspond to partial heights of the workpiece. These vertical sections have preferably same or similar height. The number of vertical sections may be a predetermined number which is independent of the machining height, preferably 8 up to 16000, and more preferably 16 to 256. Alternatively the number of vertical sections may be determined on the base of the actual machining height, such that the size of each vertical section is for instance 1 mm, which fits with the accuracy by which the discharge position can be determined by means of the partial currents method.

FIG. 2 shows such provision of dividing the workpiece height into vertical sections starting from the lower edge of the workpiece (Z=0), and assigning a discharge to the respective vertical section.

Discharge counter 7: A discharge counter 7 is allocated to each vertical section. After each discharge the current sensor information is analyzed using the partial currents method. The values of the partial currents I20 and I30 flowing through an upper feeding path 25 and a lower feeding path 35 are measured and the discharge position $Z_{Di}$ of each discharge $D_i$ is determined on the base of a difference of the partial discharge currents (I20–I30); thus the discharge position is proportional to the difference of the partial discharge currents. More specifically, the current difference value of partial discharge current signals (I20–I30), divided by the sum of the partial discharge currents I20+I30, multiplied by the half distance between the current feeders $(Z_{FU}+H_{WP}+Z_{FL})/2$ determines the discharge position $Z_{Di}$ of each discharge $D_i$ occurring along an engagement line of the wire and the workpiece, i.e. the distance of the actual discharge from the midpoint between the current feeders. The discharge position $Z_{Di}$ is the distance between the current discharge $D_i$ and the midpoint between the current feeders, which in a symmetrical constitution $(Z_{FU}=Z_{FL})$ corresponds to the center position (at half of the height) of the workpiece 2. This distance has positive or negative sign. The distance $Z_L$, of the current discharge $D_i$ from the bottom of the workpiece Z=0 is computed by adding half workpiece height, $H_{WP}/2$. The discharge is assigned to the respective determined vertical section $S_j$ of the workpiece, and the discharge counter of the respective vertical section $S_j$ is incremented by 1.

Observation period: The distribution of discharges is computed and if needed displayed for a predefined observation period which is expressed either as a predefined number of discharge pulses $N_{DTM}$, or as a predefined time $T_M$. The observation period can be seen as a rolling sampling window. The observation period should be appropriately selected, such as to comprise a significant number of discharges per vertical section, for any workpiece height and also in case of stepped parts. A suitable observation period provides a picture of the distribution of the discharges in time and space, to distinguish any uneven distribution of the discharges.

Preferably the observation period is continuously updated with latest discharge information, so that the discharge distribution reflects the actual situation, in real time. Preferably, the oldest discharge is eliminated with each latest discharge added.

The observation period can be automatically determined, so as to adapt the duration $T_M$ or the number of discharges $N_{DTM}$ to comprise a significant number of discharges for the further analysis and to provide a picture of the distribution of the discharges in time and space. For instance the observation period can be selected in consideration of the workpiece height, considering a typical number of vertical sections and a typical average number of discharges per vertical sections.

Means for signal analysis: The analysis of signals is made by means of a suitable programmable circuit, which receives the values of the partial currents of the upper and lower current feeding paths, determines the position of each discharge in known manner, then assigns the discharge to a determined vertical section and increments the counter of said vertical section by 1. Typically said programmable circuit is a field-programmable gate array (FPGA).

A counter array can be managed as a circular buffer, so that the picture of the discharge distribution is duly updated. For instance the oldest discharge in the memory is deleted with each new discharge. However this method is formal and can be simplified by less accurate but more practical methods.

Protection levels: In view of the monitoring and control of the process one or more protection levels consisting in a determined limit for the number of discharges per vertical section are set. The machining process is initially conducted with the machining parameters suggested by the machining technology, without any particular limitation. When the actual number of discharges in a vertical section exceeds respectively falls below such protection level, an action specific to that protection level is taken. In particular, the highest number of discharges actually occurring in a vertical section considering all vertical sections determines an according machining parameter adjustment, if a protection level is exceeded, respectively under-run. In this way the machining process is controlled in real time in consideration of the highest number of discharges, leading to a safe, smooth and efficient control of the machining process.

Preferably the overall workpiece discharge distribution monitoring loop (first control loop) is permanently active and operates in real time. Its primary function is to adapt the machining parameters to the actual highest number of discharges per vertical section or peak discharge density in the gap. Preferably the parameters are adapted immediately, in real time, when the peak number of discharges per vertical section exceeds a set protection level. This means typically that the machining parameter adjustment is made with the discharge following the discharge which caused the overrun of the protection level. In this way the process is conducted in safe but efficient way. If a protection level is exceeded it is thus not necessary to complete an observation period to adapt a machining parameter.

On the other hand, when the highest number of discharges per vertical section under-runs, i.e. falls below a given protection level, the machining parameter adjustment may be immediate or delayed. Typically the machining parameter adjustment with the highest number of discharges per vertical section falling below a given protection level may be done at the end of one or more observation period, or after a set parameter adjustment delay. Preferably, if it is determined that a protection level is repeatedly exceeded and under-run, then said parameter adjustment delay is progressively increased. In this way frequent machining parameter adjustments are avoided.

The total number of discharges of an observation period can be computed as the product of a set average number of discharges per vertical section $D_{SAvg}$ and the set number of vertical sections $N_S$. For instance a set average number of discharges per vertical section $D_{SAvg}$ is 32 and the set number of vertical sections $N_S$ is 32, so that in this case the number of discharges of an observation period is 32*32=1024. Vice versa, the average number of discharges occurred in the observation period in each vertical section can be computed by dividing a set total number of discharges of an observation period by a set number of vertical section $N_S$. In a preferred embodiment the average number of discharges is used as reference for the automatic setting of protection levels. According the invention this is made as follows: determining the average number of discharges occurring in each vertical section, whereas said average number of discharges is computed by dividing the number of discharges of an observation period by the number of vertical sections S; and then, setting one or more protection levels by multiplication of the average number of discharges by a predefined protection factor ($k_{pl}$, $k_{pl1}$, $k_{pl2}$, . . . ). For instance, a first protection level can be set at 2 times the average number of discharges, that is, considering a predefined factor 2 with respect to the average value for the setting of the first protection level. In the case of the above example, 32*2=64 discharges per vertical section, so that the protection level is automatically adapted to the set number of vertical sections and the set observation period. Also, decisions can be taken based on whether the number of discharges in a sector exceeds or falls below the average value by a predetermined amount.

Typically a plurality of protection levels are predefined for various predetermined limit number of discharges per vertical section. Same or different protection levels are set for the two cases, that is, the case when the actual number of discharges in one or more vertical sections exceeds a determined limit, or the case when the actual number of discharges in all vertical section falls below a determined limit. For instance, when the number of discharges in a vertical section exceeds a first protection level the pulse pause is prolonged, whereas when the number of discharges in all vertical sections fall below a second protection level the pulse pause is shortened. Protection levels may be easily implemented, for instance by appropriately setting certain predetermined limits for the number of discharges per vertical section as shown in FIG. 3.

Protection levels may alternatively be implemented as an algorithm which is used to determine the adjustment to be adopted when a determined limit number of discharges per vertical section is exceeded in any vertical section, and which progressively adjusts one or more machining parameters based on the highest actual number of discharges per vertical section along the entire engagement line of wire and workpiece. For instance, in case of the machining of a plan parallel workpiece the machining parameters may be reduced linearly when a certain number of discharges per vertical section is exceeded. This number of discharges from which a reduction is applied is for instance the average number of discharges per vertical section occurring during an observation period. For the case mentioned earlier of 32 vertical sections and an average of 32 discharges per vertical section, the percentage of pulses to be applied in function of the highest number of number of discharges per vertical section $N_{Dhigh}$ may for instance be determined as follows: $-0.0022*N_{Dmax}+1.0681$.

By using a formula to progressively adapt the machining parameters to the highest number of number of discharges per vertical section $N_{Dhigh}$ the process can be steered more smoothly.

In a preferred embodiment the protection levels are set as a function of the machining target, i.e. speed, accuracy. If the machining target is to a high accuracy the protection level may be set to a comparably low value. In other terms, the machining parameters are adjusted with comparably small unevenness in the distribution of discharges. Here a first protection level, respectively a first protection factor $k_{p1}$ is set such that first machining parameters adjustment occurs when a maximum number of discharges per vertical section exceeds an average number of discharges by for instance 30%. In this way uneven material removal is quickly detected and parameters are adapted to get possibly straight machining (vertical straightness of machining surface), also if there is no deterioration of the process in any vertical section.

By counting the number of discharges per vertical section, the distribution of discharges along the engagement line of wire and workpiece is continuously determined. By setting a protection level a high number of discharges in one or more vertical sections is easily detected and the machining parameters can be adjusted to reflect the discharge distribution, in particular to adapt the machining parameters to the vertical section with the highest number of discharges. In this way the machining process is monitored and overall stability of the machining process is improved.

By counting the number of discharges per vertical section the method further quickly discriminates variations of the effective cutting height due to steps or holes along the cutting path. If these height variations provoke a significant local rise of the number of discharges in a vertical section or a general rise of the number of discharges over multiple vertical sections, this may lead to a surpassing of a protection level, which triggers an adaptation of machining parameter such as the adjustment of the pulse energy or suppression of certain discharge pulses according to the settings of the specific protection level.

Machining parameters adjustment may also be derived in function of the specific position of the exceeding vertical sections counters. For instance, the adjustment of machining parameters may be specifically targeted to a case where a certain protection level is exceeded at the topmost and/or lowermost vertical section, or, a to case where a certain protection level is exceeded at a vertical section at the half workpiece height or in proximity thereof. Machining parameters may be further adjusted in function of the number of vertical sections S where the counter for actual number of discharges exceeds or under-runs a certain protection level or an average number of discharges per vertical section.

In a preferred embodiment, a straightness error is assessed by determining the difference of the outer vertical section counters, i.e. the vertical sections adjacent to the workpiece surfaces, and the inner vertical section counters, i.e. the vertical sections at the center of the workpiece. In particular, the sum of discharges counted in a plurality of vertical sections at the top and/or bottom of the workpiece may be compared with the sum of discharges counted in a plurality of vertical sections counters at the half workpiece height. For instance, the sum of the discharges occurring in the observation period in the 5 topmost and the 5 lowermost vertical sections is subtracted from the sum of the 10 vertical sections at the center of the workpiece, and the computed difference is used as a measure to determine the straightness of the machining. Obviously respective average number of discharges can be used instead of a sum for the computation. Similarly the ratio of the number of discharges of outer vertical section counters and the number of discharges of the inner vertical section counters can be used as a measure of the straightness, too. Other variants to estimate the straightness error are possible.

The difference of these values or the ratio thereof is are used to assess an uneven material removal along an engagement line of a wire electrode and the workpiece. In particular a straightness error such as a concave or convex shape of the cut surface, as shown in FIG. 12 is recognized and quantified. The type and amount of straightness error may be estimated in the course of machining based on the determined discharge densities, as shown in FIG. 11.

In a preferred embodiment, a straightness error given by uneven distribution of the discharges is estimated as follows: dividing a workpiece height $H_{WP}$ into a number of vertical sections S of the workpiece, setting a defined observation period $T_M$, $N_{DTM}$, with each discharge Di, determining a discharge position $Z_{Di}$ of each discharge Di along an engagement line of a wire electrode and the workpiece and assigning each discharge Di to a matching vertical section Sj of the workpiece based on the determined position $Z_{Di}$ of each discharge, counting the number of discharges $N_{Dj}$ occurring in each vertical section $S_i$ within the observation period $T_M$, $N_{DTM}$, determining an average number of outer discharges, as the average number of discharges counted in one or more topmost vertical sections and the discharges counted in one or more lowermost vertical sections, determining an average number of inner discharges, as the average number of discharges counted in one or more vertical sections at the half workpiece height, determining the difference between said average number of outer discharges and said average number of inner discharges, adjusting at least one process parameter based on said determined difference.

The type of error is indicated by the sign of this difference and the amount is indicated by the magnitude. A correction of the assessed straightness error is made by a suitable machining parameter adjustment.

The uneven material removal may be counterbalanced by real time adjustment of the machining parameters. Besides the mechanical tensioning of the wire and the flushing forces, the main forces acting on the wire are the attractive force between wire and workpiece, which is determined by the voltage, and the repulsive force, which is determined by the pulse current. The straightness error can thus be corrected in real time by identifying the discharge densities in one or more vertical section at the top and/or bottom of the workpiece and at half workpiece height, deriving the straightness deviation from the difference of discharge densities, comparing said straightness error with a given straightness tolerance and by adapting machining parameters as follows:

If it is determined that the part is becoming concave, that is discharge density is higher at the center of the workpiece, decreasing the gap voltage and/or increasing the pulse frequency and/or increasing pulse amplitude; and If it is determined that the part is becoming convex, that is discharge density is lower at the center of the workpiece, increasing the gap voltage and/or decreasing the pulse frequency and/or decreasing pulse amplitude.

A model can also be used to refine the algorithm (e.g. $k_1*U^2=k_2*I$, where U is the gap voltage, I the pulse peak current, $k_1$ and $k_2$ are coefficients).

Alternatively to the real time straightness correction illustrated here above, a correction may be achieved by applying particular machining strategies, for instance the superposition of a relative displacement of a wire and the workpiece, such as described in JP62114828A or JP2009233842A, which carry out alternating transverse movements to the machining path. Here the amplitude of the transverse movements may be set based on the uneven material removal which is determined as described hereabove, i.e. by determining the difference between the average number of outer discharges and the average number of inner discharges.

Alternatively, the straightness deviation may be determined in real time as before by determining the difference of discharge densities in vertical sections, and by correcting the shape error in a subsequent pass, i.e. one or more trim cut.

In a preferred embodiment it is determined if there is an uneven distribution, with an peak number of discharges per vertical section occurring around the middle of the engagement line of wire and workpiece or below, as shown in FIG. 6. Such condition may be sometimes due to bad flushing condition, and may occur for instance with stepped parts. Uneven distribution can be determined by computing the ratio between the highest number of discharges per vertical section and the average number of discharges per vertical section occurring during an observation period.

The tendency to a discharge concentration can alternatively be detected by determining the protection level to be adopted for the average number of discharges per vertical section, and determining the protection level to be adopted for the peak number of discharges, and monitoring the ratio of the two protection levels. If this ratio is for instance 2 it can be derived that there is an uneven distribution of discharges in the engagement line of wire and workpiece. In this case machining parameters are further adapted, for instance by prolonging a pulse pause.

Flushing: Knowingly the flushing conditions are very important for any electrical discharge machining process. In WEDM the gap flushing efficiency is affected by height variations along the cutting path. The pressure of the flushing fluid provided through the nozzles 23, 33 to the kerf drops as soon as the nozzle openings do not entirely cover the workpiece. FIG. 8*a*-8*d* show a various workpiece sections along the cutting path, from an ideal flushing condition shown in 8*a* to very difficult flushing condition shown in 7*c* and 8*d*. The condition shown in 8*a* is the common case, with parallel top and bottom workpiece surface, in which the flushing is not affected by any steps or openings. Here the nozzles are normally close to the surface, providing best possible flushing to the kerf. FIG. 8*b* shows the case of a workpiece surface which is stepped above and below. FIGS. 8*c* and 8*d* show difficult flushing condition, in which the pressure of the flushing drops due to the intermediate apertures. In case of a stepped part, or machining in proximity of the workpiece margin, the fluid pressure may severely drop while the discharges may still occur along the entire workpiece height. It is thus advisable to anticipate the occurrence of a process degeneration by monitoring the actual flushing condition along the machining path. This may be done easily by monitoring the flushing pressure in the upper and lower nozzle 23,33, for instance by means of pressure sensors integrated with the respective supply circuit. In this way it can also be derived whether the part is stepped at the upper edge, at the lower edge, or both, and process can be controlled in consideration thereof.

As anticipated here above, the comparison of the highest number of discharges per vertical section with said protection level leads to an predefined action if it is determined that the protection level is exceeded or under-run. In general terms this predefined action consist in an adaptation of the machining parameters to achieve optimal machining performance (including cutting speed) in consideration of the actual engagement conditions of wire electrode and workpiece, and anticipating a process degeneration due to excessive contamination of the gap. The action is essentially an adaptation of the mean energy or adaptation of the flushing used to conduct the process in a sustainable way. Specifically, a preferred provision consists in an adjustment of one or more of the following parameters:

the pulse pause,
the pulse frequency,
pulse energy or current,
the flushing pressure and/or flow,
the wire speed,
the wire tension
the relative position of the wire with respect to the workpiece.

Preferably the machining parameters are adjusted such as not to affect excessively the surface quality, thus mainly the pulse pause or the pulse frequency is adjusted.

Pulse suppression: A preferred provision having similar effect consists in the suppression of certain pulses as a function of the currently determined protection level. This pulse suppression can be organized in many ways. A pulse suppression scheme will now be described with reference to FIGS. 7*a,b*, representing respectively an example of a predefined suppression scheme for normal discharges (FIG. 7*a*) and a predefined suppression scheme for so called "short" discharges (FIG. 7*b*). The suppression scheme determines the amount of discharges to be suppressed to reflect the current machining condition by applying a sustainable maximum amount of discharges per vertical section. In particular, the fraction of discharges to be suppressed is determined in function of the flushing condition at the upper and lower edge of the workpiece, and in function of the highest number and type of discharges in a vertical section within the current observation period. For example, if the workpiece is not stepped at the upper and lower edge, and the section with the highest number of discharges per section had 67 normal discharges within the current observation period, then number of discharges is reduced by $1/12^{th}$ with respect to the normal value. This can be done by canceling a discharge pulse after each 11 pulses, or by reducing the pulse frequency accordingly. The method is adopted with any currently selected main cut machining technology.

As can be seen in FIG. 7*b* the same approach for the determination of discharges to be suppressed is adopted for short discharge pulses, however here the fraction of discharge pulses to be suppressed is generally higher than with normal pulses.

For avoidance of doubts, it is specified that the mentioned discharge pulse suppression has the effect of a machining parameter adjustment, and thus is considered as such. Here a fraction of the discharge pulses specified with the used machining technology are always suppressed, according to the determined flushing condition, and the highest number and type of discharges per vertical section. Thus, adjusting at least a machining parameter includes suppressing at least one successive discharge respectively suppressing a fraction of discharge pulses which are normally used for the given machining condition.

Thus, in a preferred embodiment at least one successive discharge pulse or a fraction of successive discharge pulses is suppressed.

In a preferred embodiment the discharges are classed in normal discharge pulses and short discharge pulses, and the discharge pulse current is adapted such that discharges being classed as normal discharge pulses have a full current amplitude, and such that discharges being classed as short discharge pulses have a reduced current amplitude, and a discharge having full current amplitude is weighted with a first factor, and a discharge having a reduced current amplitude is weighted with a second factor, and the counted number of discharges $N_{Dj}$ occurring in each vertical section $S_j$ and/or the number of consecutive discharges $N_{DC}$ occurring in each vertical section Sj is corrected with the first weighting factor and the second weighting factor.

In other words the discharge pulses are classified in known manner and weighted accordingly to reflect their characteristics, e.g the damage to wire and/or surface. For instance, a normal discharge is weighted with a factor 1, whereas a short pulse is weighted with a factor 1.3. The discharge pulses classification scheme can be made more sophisticated, using more than two classes and a suitable weighting for each class, and determining an overall weighting. In this way discharges can be easily accounted according to the classification of the pulses, and can be fed to an algorithm for the determination of an appropriate number of pulses to be suppressed.

Example: The following example illustrates a practical case with reference to FIG. 2. A workpiece having a height $H_{WP}$ of 50 mm is divided in 24 vertical sections, each section thus having a height of approximatively 2.1 mm. Here the first section $S_1$ starts from Z=0 to Z=2.1 mm, the second $S_2$ starts from Z>2.1 mm to Z=4.2 mm, etc. up to the last section $S_{24}$ starts from Z>47.9 to Z=50 mm. An observation period $N_{DTM}$ of a 1024 discharge is set, which may correspond to an equivalent observation period $T_M$ of 200 ms. In this case the average number of discharges per vertical sections is 42.7.

After each discharge pulse, the discharge position is derived from the partial currents I20, I30. Information is analyzed within the FPGA, and the digital discharge counter of the matching vertical section is incremented. In the present example the latest discharge which is represented by a star has been identified at a position $Z_{Di}$=−10 mm, that is at $Z_{Li}$=$Z_{Di}$+$H_{WP}$/2=15 mm from the bottom of the workpiece. Thus the latest discharge has occurred in vertical section $S_8$, which ranges from Z>14.6 to Z=16.7 mm. The digital discharge counter of vertical section $S_8$ is incremented by 1.

FIG. 4 illustrates a distribution of discharge pulses; here the workpiece height $H_{WP}$ is 54.86 mm. The workpiece height is again divided into 24 vertical sections, each section thus having a height of about 2.3 mm. The distribution of discharges is comparably homogeneous over the entire engagement line of the wire and workpiece. The section with the highest number of discharges detected in the observation period has 53 discharge pulses recorded. The first protection level is set at 64 discharges per vertical section. In this exemplary case the protection level will not intervene since the highest number of discharges detected in the observation period is well below the first protection level, and because both, the upper and lower nozzle are proximate to the respective edge, so that the flushing is favorable. In other words, the machining parameters which have been set for the given workpiece and for the desired machining target remain unaffected.

FIG. 5 illustrates a distribution of discharge pulses for the same workpiece at another position of the machining path. Here the discharges occur mainly at a central portion of the engagement line of the wire and workpiece with some discharges occurring at the lower portion. It can be derived that the workpiece is stepped at the upper edge and has an opening in the lower region. A pressure sensors in the supply circuit of the upper and lower flushing nozzles detects the pressure drop due to the fact that the workpiece is stepped at the upper edge. The signal provided by the pressure sensors is compared with one or more threshold levels to identify the flushing condition. The number of discharges per vertical section exceeds a predetermined fourth protection level in many sections. According to the table at FIG. 7a the overrun of the $4^{th}$ protection level with a workpiece stepped at one edge triggers a discharge pulse suppression of one third of the pulses. Here the wire electrical discharge machining process is thus controlled according to the overrun of a protection level and according to the flushing condition by pulse suppression, means by canceling a fraction of the discharge pulses normally intended for the given settings.

Range fitting and calibration: As described earlier the position of the discharges is typically derived from the difference of measured partial currents I20−I30 flowing through the upper and lower current feeding path. Theoretically, in a fully symmetric case, with same partial current signals I20 and I30, the discharge occurs at the midpoint between the two current feeders. The current difference value of partial discharge current signals I20−I30, divided by the sum of the partial currents I20+I30, multiplied by the half distance between the current feeders determines the distance of the actual discharge from the midpoint between the current feeders. Due to inhomogeneous inductance in the machining area, asymmetries of the current feeding path, wearing of the current feeders or uneven condition, different workpiece heights, wire electrode diameters, and limited system resolution etc. the absolute position where an electrical discharge is detected may be slightly inaccurate, respectively shifted by a variable amount.

In a preferred embodiment a range of the discharge current difference values (I20−I30) is determined for at least two different workpiece heights and the range of the discharge current difference values for any other workpiece height are interpolated or extrapolated on the base of the previously determined discharge current difference values.

In a preferred embodiment a range of the discharge current difference I20−I30 values of partial current signals I20 and I30 is identified at least once, for at least two different workpiece heights, and for one or more wire electrode diameters or types, because these factors affect said range of the discharge current difference. In other words, the range of the discharge current differences describes the highest and lowest values of a distribution discharge current differences determined with a given test condition. The range for other workpiece heights can be thus determined, for instance by linear interpolation for a given wire electrode, as shown FIG. 10.

In a preferred embodiment the accuracy of the discharge position detection is improved by an automatic range fitting cycle, in which the position of an topmost discharge is associated with the position of an upper edge of the workpiece and/or the position of an lowermost discharge is associated with a lower edge of the workpiece. More precisely, the range fitting is achieved by: determining the topmost discharge and the lowermost discharge of a distribution of discharges occurring along an engagement line of a wire electrode and the workpiece during at least one observation period $T_M$, $N_{DTM}$; associating the topmost discharge with the position of an upper edge of the workpiece and/or associating the position of an lowermost discharge with a lower edge of the workpiece; and, correcting a discharge position scale to match with the associated positions. More generally, the discharges occurring at the extremities of a discharge distribution range are identified and associated to a known position, respectively height, generally to the top and bottom of the workpiece. In this way this discharge positions is corrected to match with said known positions. This automatic range fitting procedure may be done for instance by one or more of the following methods:

By provoking discharges over the entire engagement length of wire and workpiece and by determining the discharges occurring at the extremities of the discharge distribution. The identified topmost and lowermost discharges are associated to geometric information such as the workpiece height, respectively to the upper edge and the lower edge thereof;

By slightly tilting the wire in the cutting direction to deliberately provoke discharges at a known position of the workpiece, i.e. the lower edge of the workpiece, respectively to provoke discharges at the topmost portion of the gap, i.e. the upper edge of the workpiece. Again the identified topmost and lowermost discharges are associated to the respective edge of workpiece. By letting the discharges occur at the lower edge first, the discharge position scale can immediately be corrected;

By measurement of the flushing pressure $p_u$, $p_l$ of an upper flushing nozzle 23 and/or a lower flushing nozzle 33, and to derive whether an topmost and/or a lower surface of the workpiece are in contact with the nozzle. In this way a stepped workpiece can be discriminated;

This last automatic range fitting procedure for a discharge position scale comprises the following steps: determining the pressure $p_u$ of an upper flushing nozzle 23 and/or and the pressure $p_l$ of a lower flushing nozzle 33; and, based on said pressures $p_u$ and/or $p_l$, determining if the upper and/or lower flushing nozzle is adjacent to the upper side and/or the lower edge of the workpiece, whereas, if based on said pressure $p_u$ it is determined that upper flushing nozzle is adjacent to the upper side of the workpiece, then the discharge position scale is corrected to match with the position of an upper edge of the workpiece, and if based on said pressure $p_l$ it is determined that the lower flushing nozzle is adjacent to the lower side of the workpiece, then the discharge position scale is corrected to match with the lower edge of the workpiece.

The workpiece height may be user specified, or derived from the part program or CAM, or measured on the machine, etc. In this way the position of discharges is corrected. The calibration procedure may be advantageously executed in a short test period, at the very begin of the machining.

The determination of the range of the discharge current difference is preferably made by the machine manufacturer whereas an automatic range fitting cycle can be made to occur automatically at the beginning of a specific machining.

The SECOND CONTROL LOOP is a workpiece discharge concentration monitoring loop, which serves to discriminate a succession of consecutive discharges occurring at any specific position of the workpiece, and to control the machining process such as to interrupt the occurrence of localized discharges, respectively a critical discharge concentration. This second loop operates in real time. Detecting of discharge concentration at a specific position of the workpiece is made by counting consecutive, that is concatenated discharges occurring in a same vertical section.

As known the EDM process is a stochastic process; discharges occur where the discharge conditions are most favorable, where the electric field is strongest. A sequence of consecutive discharges occurring at the same position is a sign of excessive local contamination which leads to a process degeneration and a risk of damage to the workpiece surface and also risk of wire breaking.

The same approach (used with the first control loop) of dividing the workpiece height $H_{WP}$ into a number of $N_S$ distinct vertical sections S is used also with the second control loop. The size of the vertical sections may be the same.

Consecutive discharges counter: According to the invention each vertical section comprises a consecutive discharges counter, by which the number of consecutive discharges $N_{DC}$ occurring in each vertical section Sj are counted.

In a preferred embodiment of the invention the occurrence of a critical number of consecutive discharges occurring at any specific position is thus avoided by the following steps: dividing a workpiece height $H_{WP}$ into a number of vertical sections S of the workpiece; counting the number of consecutive discharges $N_{DC}$ occurring in each vertical section $S_j$; and adjusting at least a process parameter, if it is determined that the number of consecutive discharges $N_{DC}$ in a vertical section exceeds a predefined maximum number of consecutive discharges $N_{DCmax}$.

Corrective action: If it is determined that the number of consecutive discharges $N_{DC}$ in a vertical section Sj exceeds a predefined maximum number of consecutive discharges $N_{DCmax}$, then at least one successive pulse is canceled, or at least one machining parameter is adjusted. Preferably the at least one adjusted machining parameter is an electrical machining parameter, since these parameters have an immediate effect to the process conditions, whereas other adjustments such as flushing, wire speed and wire movements, etc., collectively referred to as mechanical machining parameters, are also possible but have delayed effect. Thus the corrective action in case of a high number of consecutive discharges may be an adjustment of one or more electrical machining parameter and one or more mechanical machining parameter.

The consecutive discharges counter of a vertical section is reset if no discharges occurs during a certain period in that vertical section. For instance a counter is reset when 10 successive discharges occur in other than the considered vertical section.

In an alternative embodiment the consecutive discharges counter is constituted as a circular buffer which stores the latest discharge position sequence of a small number of latest discharges, or better, the buffer stores the vertical section $S_j$ which is associated to the position of each latest discharges. For example illustrated in FIG. 13, the consecutive discharges counter is a circular buffer which is dimensioned to comprise the vertical section $S_j$ of the latest 10 discharge pulses. This is generally enough to determine a localization of discharges. Determination of the overrun of a predefined maximum number of consecutive discharges $N_{DCmax}$ is done by monitoring the occurrence of consecutive same vertical sections in the circular buffer, which comprises discharge position sequence. In the exemplary case, the workpiece height $H_{WP}$ is divided in 32 vertical sections S, and the predefined maximum number of consecutive discharges $N_{DCmax}$ is set to 5. Since here a the number of consecutive discharges $N_{DC}$=5 have occurred in vertical section $S_j$=9, a prolonged pulse pause, a pulse suppression or one or more other measure is now executed in real time. In an alternative embodiments the consecutive discharges counter is compared with a warning number of consecutive discharges $N_{DCwarn}$. That number is below of a predefined maximum number of consecutive discharges $N_{DCmax}$ and does not provoke any immediate pulse suppression nor a parameter adjustment. However, If said warning number of consecutive discharges $N_{DCwarn}$ is exceeded several times in a row, then then it may be specified that same or similar measures are taken, as if a predefined maximum number of consecutive discharges $N_{DCmax}$ would have been exceeded.

Preferably the occurrence of a certain number of consecutive discharges $N_{DCwarn}$ is recorded for further monitoring, tracking and control purposes. For instance, each overrun of the warning number of consecutive discharges $N_{DCwarn}$ is recorded with the vertical section in which the consecutive discharges occur, and if it is determined that the warning number of consecutive discharges $N_{DCwarn}$ is repeatedly exceeded then one or more machining parameters are adjusted. Preferably an overrun is also recorded with respect to the position along the path. By recording the vertical section and the position along the machining path an exact 2 dimensional map of the of the warning events is provided. The occurrence of consecutive localized discharges, which are for instance determined as described here above, can be used as input value to a machine learning system, to determine suitable machining parameters and to improve the process.

In a preferred embodiment of the invention, the consecutive discharges $N_{DC}$ occurring in a vertical section Sj are counted including the consecutive discharges occurring in the adjacent vertical section $S_{j+1}$.

More generally discharges may are also considered to occur consecutively at the same position in the following cases:

- when the consecutive discharges occur in two adjacent vertical sections. For instance, if a vertical sections captures 3 consecutive discharges, and then the adjacent vertical section counts 4 consecutive discharges, thus the sum of consecutive discharges is 7; with 7 consecutive discharges a predefined maximum number $N_{DCmax}$ of for instance 6 consecutive discharges is exceeded. In this way consecutive discharges occurring at the border of two adjacent vertical sections are also gathered. This may also somehow circumvent an inaccuracy of the discharge position detection system;
- when alternately occurring in the observed vertical section and in one or more other vertical section. The term alternately means for instance, that at least each second or third discharge of a discharge succession occurs in the observed vertical section. In this way it is also deduced that a localization is given.

In further embodiments of the invention each discharge of a succession of discharges is weighted to reflect the time sequence of a succession of discharges. For instance a discharge is multiplied after each discharge by a forgetting factor $\lambda<1$, for instance $\lambda=0.9$, to correctly consider an older discharge with respect to a newer discharge. Further the forgetting factor (i.e. weighting of discharges according to their succession in time) mentioned here above can be combined with the earlier mentioned weighting of discharges according to the pulse classification.

The specification of vertical sections is very helpful in this second control loop, for bookkeeping of the consecutive discharges occurring per vertical section in view of the identification of a discharge concentration and immediate parameter adjustment to resolve a discharge localization.

Preferably any event, i.e. any overrun or under-run of a protection level (first control loop) or any overrun of a predefined maximum number of consecutive discharges $N_{DCmax}$ (second control loop) is recorded together with the associated position along the machining path at which the event has been recorded (or workpiece coordinates), and with the provisions taken, and preferably this is made for every machining step. In this way the process can be traced in view of subsequent part inspection, to correlate any defect with parameter settings, respectively with any parameter adjustment.

Preferably the position at which an event occurred during a machining step (f.i. main cut) is particularly monitored during a successive machining step (f.i. $1^{st}$ trim cut), to verify if an event still occurs at the same position along the machining path, where an event has been recorded during previous cut. Preferably the distribution of discharges along an engagement line of a wire electrode and the workpiece in the course of a main cut is stored. This is preferably made by determining the active vertical sections at along the machining path. This information is used to in trim cuts to adjust machining parameters, for instance the flushing, anticipating any critical condition. In this way machining quality is improved.

These provisions of keeping trace of the events and correlation with the position along the machining path is applicable to both, the first control loop and the second control loop.

The THIRD CONTROL LOOP is a wire discharge concentration monitoring loop, which serves to discriminate a succession of consecutive discharges occurring at any specific position of the traveling wire, and to control the machining process such as to interrupt the occurrence of localized discharges.

This third control loop prevents a wire breaking which may occur if a plurality of discharges hit the same position of the traveling wire in short time. In particular the combination of excessive thermal weakening caused by a number of consecutive discharges occurring at the same position, plus, mainly, the permanent mechanical tensioning of the traveling wire, the discharge pressure and electrodynamic forces may provoke wire breaking. Here the consecutive localized discharges lead to a heating and thus softening of the wire material, which thus is no longer capable to resist to the mentioned combined load.

According the invention, detection of discharge concentration at any specific position of the traveling wire is made again by counting consecutive discharges occurring in each vertical section. The same approach used with the first and second control loop, i.e.: dividing the workpiece height $H_{WP}$ into a number of $N_S$ distinct vertical sections S of the workpiece; counting the number of consecutive discharges $N_{DC}$ occurring in each vertical section $S_j$; and adjusting at least a process parameter, if it is determined that the number of consecutive discharges $N_{DC}$ in a vertical section exceeds a predefined maximum number of consecutive discharges $N_{DCmax}$; is thus used also with the third control loop. The size of the vertical sections may be the same. In principle it is possible to conduct this wire discharge concentration monitoring loop (third control loop) in the same way as the afore mentioned workpiece discharge concentration monitoring loop (second control loop). The fact that the wire is traveling can be neglected if the number of vertical sections is not very high and thus vertical sections are comparably wide. This is due to the fact that generally the discharge frequency is such high that in case of concentration of discharges at a certain position of the traveling wire, these consecutive discharges still occur in the same vertical section or at the worst in the adjacent vertical section. However, if the number of vertical sections is high and the transition time of the wire through each vertical sections is in the range of pulse discharge frequency, then the wire traveling speed cannot be ignored.

This is now demonstrated by an example. The speed of the traveling wire of a WEDM is in the range of 100 to 400 mm/s and pulse frequency is in the range of 5 kHz to 100 kHz for main cut, and up to 2 Mhz for trim cut. Assuming a workpiece height $H_{WP}$ of 50 mm, a division of the workpiece height in $N_S$=50 vertical sections, each vertical section S thus having a height of 1 mm. Assuming a discharge pulse frequency $f_D$ of 5 kHz ($T_D$=200 μs) and the highest wire traveling speed of 400 mm/s ($T_{VS}$=25 ms) there are still 12.5 discharge pulses which may occur in the same vertical section or the subsequent vertical section if the consecutive discharges occur at a fixed position of the wire.

Since WEDM process is stochastic, successive discharges do normally occur at random positions. If consecutive discharges occur at the same position, according the invention this will be determined by counting the number of consecutive discharges $N_{DC}$ occurring in a vertical section $S_j$ or in the subsequent vertical section $S_{j+1}$. Here again, if it is determined that the number of consecutive discharges $N_{DC}$ in a vertical section Sj exceeds a predefined maximum number of consecutive discharges $N_{DCmax}$ admitted for the set wire electrode, then at least one process parameter is adjusted, for instance one or more successive discharge pulses is canceled. The maximum number of consecutive discharges $N_{DCmax}$ allowed by the wire discharge concentration monitoring loop can be same or different to the workpiece discharge concentration monitoring loop.

The risk of getting a "false positive event" can be reduced by a plausibility check which further comprises monitoring one or more process signals such as the erosion voltage, the delay time, the number of short discharge pulses, or else.

As said the number of consecutive discharges $N_{DC}$ occurring in each vertical section is compared with a predefined maximum number of consecutive discharges $N_{DCmax}$. The maximum number of consecutive discharges $N_{DCmax}$ is normally determined by way of experiments for a number of machining parameters, respectively process conditions.

In a preferred embodiment the predefined maximum number of consecutive discharges $N_{DCmax}$ is determined using machine learning, preferably using classification or logistic regression technique. Specifically, classification or logistic regression type algorithms are used to determine the maximum allowed number of consecutive discharges $N_{DCmax}$ for other machining conditions, as mentioned above which lead to at least two different states, namely 'safe condition' and 'wire break' condition. Further, additional classification states can be added, such as approaching critical wire break condition. An alternative representation of the states could be for example 0 to 5, where 0 is safe and 5 is wire break. The predefined maximum number of consecutive discharges $N_{DCmax}$ is determined for different machining parameters, including the wire type, material and geometry among others. Here, apart from the machining parameters such as applied current, voltage, wire speed, wire tension, pressure in upper and lower flushing nozzles, etc., secondary machining conditions such as water temperature, wire condition, etc. can also be included to predict wire break safety state. Thus, the training of the said classification algorithm is performed using various machining parameters, and occurring number of consecutive discharges $N_{DC}$, where wire condition is recorded, for instance at least as 'safe' and 'wire break'. Based on such training, the value of $N_{DCmax}$ which leads to wire break condition or the value of $N_{DCmax}$ which approaches wire break condition with the given machining parameters is determined. Such wire break prediction condition is for instance trained once, and parameters of the algorithm are determined once, by the machine manufacturer. However a training set and identification of parameters of the algorithm can be constantly updated during the life cycle of the machine for various applications, where the application specific details are added to the training set to constantly update the $N_{DCmax}$ and/or $N_{DCwarn}$ values which for that particular or similar machining state may be able to determine where concerning the wire breakage or workpiece damage, the machining is in 'safe' condition or is approaching a 'critical' condition.

Additionally, based on the safe or critical state and the determined maximum number of consecutive discharges $N_{DCmax}$, corrective action can be taken by the control loop to change the machining parameters such as discharge frequency and discharge current among others to maximise the productivity of the machining. In a preferred embodiment, once such $N_{DCmax}$ is known either from training performed once, or constantly updated information for training, reinforcement type algorithms are used to adapt the machining parameters, to always limit the machining state between safe and critical. The use of reinforcement learning type algorithm rewards the change in the machining parameters which lead the process to the 'safe' state and does not reward the actions of change of parameters which lead the process towards the 'critical' state. Since the algorithm tries to achieve higher cumulative reward, the process control tries to keep the machining near safe conditions as opposed to the critical conditions which can lead to wire breakage or surface damage. Thus, combination of the known classification or logistic regression and reinforcement type machine learning algorithms can continuously lead the machining parameters control to keep the process in the 'safe' condition to avoid wire breakage while keeping the process productivity to near optimal.

In a preferred embodiment, determination of a protection level used with the first control loop is similarly made, using machine learning, preferably using classification or logistic regression technique. Again, classification or logistic regression type algorithms are used to determine the protection level required for other machining conditions, and which lead to at least two different states, for instance a 'safe' process and a 'process deterioration' condition.

The FOURTH CONTROL LOOP is a wire wear monitoring and control loop. This fourth control loop determines the cumulated local wearing suffered by the traveling wire electrode during the movement along its engagement line with the workpiece.

Each discharge generates a crater in both, the workpiece and the wire. The wire is continuously renewed by the fact that it travels through the workpiece, however each crater represents a flaw in the wire. This is of course a problem occurring mostly with the main cut, where very high peak currents of several 100 A are used. If several discharges occur at the same position of the traveling wire during its passage through the piece, then the wire cross section may be excessively reduced, and the wire may thus break under the combined load of mechanical tension of the traveling wire and other forces provoked by a discharge occurring at the already weakened position. Moreover certain wires are zinc coated; zinc enhances the cutting performance due to its material properties, such as contribution to heat dissipation with evaporation, however once the zinc phase is locally consumed the wire is no longer protected. Thus the scope of this fourth control loop is to determine the cumulated local wearing suffered during the passage in front of the workpiece and to take an appropriate action if it is determined that a certain region of the wire has suffered a critical number of discharges.

According to the present aspect of the invention, the cumulated local wearing at any specific position of the traveling wire is determined again by counting the discharges occurring in each vertical section of the workpiece. The same approach (used with the first, second and third control loop) of dividing the workpiece height $H_{WP}$ into a number of $N_s$ distinct vertical sections S and counting discharges occurring in each vertical section is thus still valid also with the fourth control loop. Here, however, at each counter shifting interval the counter values of the number of discharges of each vertical section are shifted to the adjacent vertical section, in wire traveling direction. Since in most WEDM the wire traveling direction is vertical, with the wire traveling downwards, the number of discharges counted by a counter of an topmost vertical section $S_Z$ are shifted to the counter of the adjacent lower vertical section $S_{Z-1}$ in wire traveling direction, and new discharges occurring in the second vertical section are cumulated, and same with each successive vertical section, until the wire reaches the lowermost vertical section $S_1$. Each new discharge is added to discharges counted earlier for each vertical section. In this way the actual cumulated number of discharges for each vertical section is determined, taking the wire movement into account to get a real time wire wearing model.

The highest cumulated number of discharges occurred over all vertical sections $N_{DWhigh}$ is continuously identified and compared with a maximum allowed number of cumulated discharges $N_{DWmax}$ occurring in a same vertical section to which a given wire electrode can safely withstand without breaking.

The maximum allowed number of cumulated discharges $N_{DWmax}$ per vertical section is identified by means of experiments, or estimated based on the current machining parameters, conditions, and settings, or extrapolated on the base of know machining parameters, conditions and settings. If it is determined that there is a risk of wire breaking due to a cumulated local number of discharges $N_{DWhigh}$ corresponding to or exceeding said maximum allowed number of cumulated discharges $N_{DWmax}$, then a countermeasure to reduce the wire breaking risk is started. This countermeasure may be for instance one or more of the following: increase of the wire speed, reduction of wire tensioning force, adjustment of flushing a prolonged pulse pause, etc.

On the other hand the wire speed may be decreased if it is determined that said maximum number of cumulated discharges is never reached with current machining parameters and conditions. For instance if the maximum number of cumulated discharges per vertical section is 10, but the highest cumulated number of discharges $N_{DWhigh,high}$ occurred over all vertical sections which has been determined over a significant time is 7, then the wire speed can be decreased. In this way the wire speed is automatically adapted to the real wearing of wire and the wire electrode is used more efficiently, with low risk of wire breaking.

In order to spatially collocate each discharge with sufficient accuracy and to determine the weakening of the wire due to reduction of the cross section, the height of the vertical sections must be comparably small. This means that two consecutive discharges occurring at a same position of the traveling wire should possibly not occur in the same vertical section. The counter shifting interval is determined by the time required for the wire to travel through an entire vertical section, thus by the traveling speed of the wire, by the workpiece height $H_{WP}$, by the number of vertical sections of the workpiece height, and by the pulse frequency.

For instance, with a pulse frequency of 5 kHz the pulse period is 0.2 ms. Assuming a wire traveling speed of 200 mm/s, a workpiece height $H_{WP}$ of 50 mm, a division of the workpiece height into $N_S=2000$ vertical sections, each vertical section S is 25 µm, thus the run-through time is 0.125 ms. With the example consecutive discharges at a same position of the wire do not fall in the same vertical section, so that the discharges can be collocated safely. The counter shifting interval corresponds to the run-through time is 0.125 ms.

With the inventive method the user can execute any wire electrical discharge machining with maximum cutting speed parameters, without particular care on whether the part is plane-parallel, stepped, has a varying cutting section or if it comprises openings. The required machining parameter adjustments will automatically apply based on the set protections, in any situation and without wire breaks.

Knowing the position of the discharges it may be desirable to display the cutting profile of a present machining, with a possibly accurate representation of the present cutting profile, reflecting the real geometric cutting conditions.

The monitoring of discharges according to their position is a powerful instrument, some of which have been described in detail here above. For instance, certain provisions described herein can be used (not conclusive):

- to detect a deterioration of upper and/or lower current path, in particular the condition of the current feeders;
- to determine a deterioration of machining conditions, for instance with workpiece materials having high electrical resistance or tendency to form oxidation layer;
- to determine the position (vertical sections) along an engagement line of a wire electrode and the workpiece where a deterioration of machining conditions is more frequently detected and derive the suitable flushing conditions, type and intensity, or other parameter settings;
- to scan the machined contour determining the vertical distribution of discharges along an engagement line of a wire electrode and the workpiece and to derive a shape error, such as a straightness error or a taper error.

For instance the contour cut in a main cut may be excessively machined in certain vertical sections due to uneven contamination of the dielectric by the erosion debris or due to wire oscillation, etc. Preferably the contour scanning is made within a trim cut. Here the shape error may be determined and corrected if it is determined that the error exceeds a preset limit. Said contour scanning may comprise the determination and analysis of process signals such as the average ignition delay time or the average pulse voltage occurring in each vertical section during an observation period, or so.

to align the wire with the workpiece at the begin of machining. The alignment is done again by determining the vertical distribution of discharges along an engagement line of a wire electrode and to correct the wire tilt angle in wire cutting direction to achieve an discharge distribution over the entire workpiece height. For instance the adjustment of the wire tilt angle is done after a first observation period, and repeated during successive observation periods, until discharges occur over the entire workpiece height.

to execute a measurement and/or a rework of an existing contour by scanning said contour with a scanning method such as the one disclosed in JPS55011761A or EP578018, but using the discharge position detection method described with the present invention. Here the contour is preferably scanned with a fixed speed and in a predefined scanning direction (e.g. CW,CCW), and the position of the upper and the lower wire guides are controlled such as to generate distributed discharges along the engagement line of wire and workpiece. The gap width is controlled by moving the wire in a direction normal to the current scanning direction. The path of said contour scanning is stored, processed to generate a new part program. The program can then be used to rework the current part or to cut a similar part.

to selectively suppress a discharge pulse, if it is determined that such discharge is not wanted at the position where it is expected to occur. Selective suppression is done by determining the position of a low power pilot pulse and by actively suppress a high power discharge pulse. In a trim cut selective suppression is done by determining the position of a discharge pulse and by suppress the immediately following ones, if these consecutive discharges are expected to occur at the same position. Selective suppression can be used to correct a shape error in cylindrical cut. Selective suppression can also be used to achieve a selective offset correction, for instance in taper cutting, by suppressing all discharges exceeding a desired number of discharges for a certain position.

The present invention is addressed to a wire electrical discharge machining process, however certain provisions described herein are correspondingly applicable to a die sinking machine, or any other electric discharge machine, provided that a discharge position/region can be identified and classed.

What is claimed is:

1. A method for controlling a wire electrical discharge machining process comprising:
    dividing a workpiece height into a number of vertical sections of the workpiece,
    setting a defined observation period,
    determining a discharge position of each of a discharge along an engagement line of a wire electrode and the workpiece, and assigning each discharge to a matching vertical section of the workpiece based on the determined discharge position of each discharge,
    counting a number of discharges occurring in each of all vertical sections within the observation period by incrementing a discharge counter for each vertical section,
    comparing the number of discharges occurring in each of all vertical sections within the observation period to identify which vertical section has an overall highest number of discharges of all of the vertical sections,
    comparing the overall highest number of discharges with one or more protection levels specifying a predetermined limit for the overall highest number of discharges, and
    adjusting at least one machining process parameter if it is determined that the overall highest number of discharges exceeds or falls below a protection level.

2. The method for controlling a wire electrical discharge machining process according to claim 1, wherein a predefined observation period is either:
    a predefined time period, or
    a predefined number of discharge pulses.

3. The method for controlling a wire electrical discharge machining process according to claim 1, in which the number of vertical sections is either:
    a predetermined number, that is 8, 16000, or therebetween, or
    computed based on an actual machining height.

4. The method for controlling a wire electrical discharge machining process according to claim 1, wherein the protection level is determined using machine learning, including using classification or logistic regression technique.

5. The method for controlling a wire electrical discharge machining process according to claim 1, wherein at least one successive discharge pulse or a fraction of successive discharge pulses is suppressed.

6. The method for controlling a wire electrical discharge machining process according to claim 1, wherein one or more of the following machining process parameters is adjusted:
    the pulse pause,
    the pulse frequency,
    pulse energy or current,
    the flushing flow/and or pressure
    the wire speed
    the wire tension
    the relative position of the wire with respect to the workpiece.

7. The method for controlling a wire electrical discharge machining process according to claim 1, wherein the partial discharge currents flowing through an upper feeding path and a lower feeding path are measured, and that the discharge position of each discharge is determined on the base of a difference of partial discharge currents.

8. The method for controlling a wire electrical discharge machining process according to claim 7, wherein the method further comprises determining a range of the discharge current difference values for at least two different workpiece heights and interpolating or extrapolating the range of the discharge current difference values for any other workpiece height.

9. A method for controlling a wire electrical discharge machining process comprising:
    dividing a workpiece height into a number of vertical sections of the workpiece,
    setting a defined observation period,
    determining a discharge position of each of a discharge along an engagement line of a wire electrode and the workpiece, and assigning each discharge to a matching vertical section of the workpiece based on the determined discharge position of each discharge, counting a number of consecutive discharges occurring in each of all vertical sections within the observation period by incrementing a discharge counter for each vertical section, comparing the number of consecutive discharges occurring in each of all vertical sections within the observation period to identify which vertical section has an overall highest number of consecutive discharges of all of the vertical sections, comparing the overall highest number of consecutive discharges with one or more protection levels specifying a predetermined limit for the overall highest number of consecutive discharges, and adjusting at least one machining process parameter if it is determined that the overall highest number of consecutive discharges exceeds or falls below a protection level.

* * * * *